US007304666B2

(12) United States Patent
Cazier

(10) Patent No.: US 7,304,666 B2
(45) Date of Patent: Dec. 4, 2007

(54) REMOTE CONFIGURATION OF MENUS

(75) Inventor: Robert Paul Cazier, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 830 days.

(21) Appl. No.: 10/385,775

(22) Filed: Mar. 11, 2003

(65) Prior Publication Data

US 2004/0179106 A1   Sep. 16, 2004

(51) Int. Cl.
*H04N 5/232* (2006.01)
*H04N 5/225* (2006.01)

(52) U.S. Cl. .................. 348/211.4; 348/207.1
(58) Field of Classification Search ........... 348/211.4, 348/207.1; 725/105
See application file for complete search history.

(56) References Cited

U.S. PATENT DOCUMENTS

| 5,473,584 | A | * | 12/1995 | Oshima ................. 369/47.11 |
| 6,006,039 | A | * | 12/1999 | Steinberg et al. ........... 396/57 |
| 6,177,957 | B1 |  | 1/2001 | Anderson |
| 2002/0054224 | A1 | * | 5/2002 | Wasula et al. ............ 348/232 |
| 2003/0163336 | A1 | * | 8/2003 | Chiu et al. .................. 705/1 |

* cited by examiner

*Primary Examiner*—Ngoc-Yen Vu
*Assistant Examiner*—Adam L. Henderson

(57) ABSTRACT

Methods and apparatus for configuring a menu of an image-capturing device are provided. The methods include entering data into a first computer, receiving the data at a second computer that is located remotely of the first computer, transferring the data to the image-capturing device from the second computer, and using the data to configure the menu of the image-capturing device.

36 Claims, 4 Drawing Sheets

REMOTE CONFIGURATION OF MENUS

BACKGROUND

Menus for digital appliances, such as digital image capturing devices, e.g., digital cameras, are often configured by a computer and downloaded onto the digital appliance for use by the digital appliance. For example, a menu of a digital camera may be configured to have a list of potential recipients for receiving pictures taken by the camera. Each potential recipient will typically have an email address or website information associated therewith.

During operation of the camera, a user can select an intended recipient from the menu. Then, when the user connects the camera to a computer, the pictures are automatically sent as an email attachment, for example, to the email address of the intended recipient or are automatically sent to the website for viewing and/or downloading by the intended recipient.

When a potential recipient's email address or website information changes. The user can reconfigure the camera menu on the computer to update the potential recipient's email address or website information. The reconfigured camera menu is then downloaded onto the camera.

One problem with configuring or reconfiguring menus for digital appliances using a computer and downloading the menu onto the digital appliance is that users who have little or no experience with configuring menus may have trouble.

SUMMARY

One embodiment of the present invention provides a method for configuring a menu of an image-capturing device. The method includes receiving data from a remote location at a computer, where the data is associated with the menu of the image-capturing device. Detecting receipt of the data at the computer and detecting that the image-capturing device is communicatively coupled to the computer are also included in the method. The method further includes transferring the data to the image-capturing device from the computer.

DETAILED DESCRIPTION

In the following detailed description of the present embodiments, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that process, electrical or mechanical changes may be made without departing from the scope of the present invention. The following detailed description is, therefore, not to be taken in a limiting sense, and the scope of the present invention is defined only by the appended claims and equivalents thereof.

Figure 1:
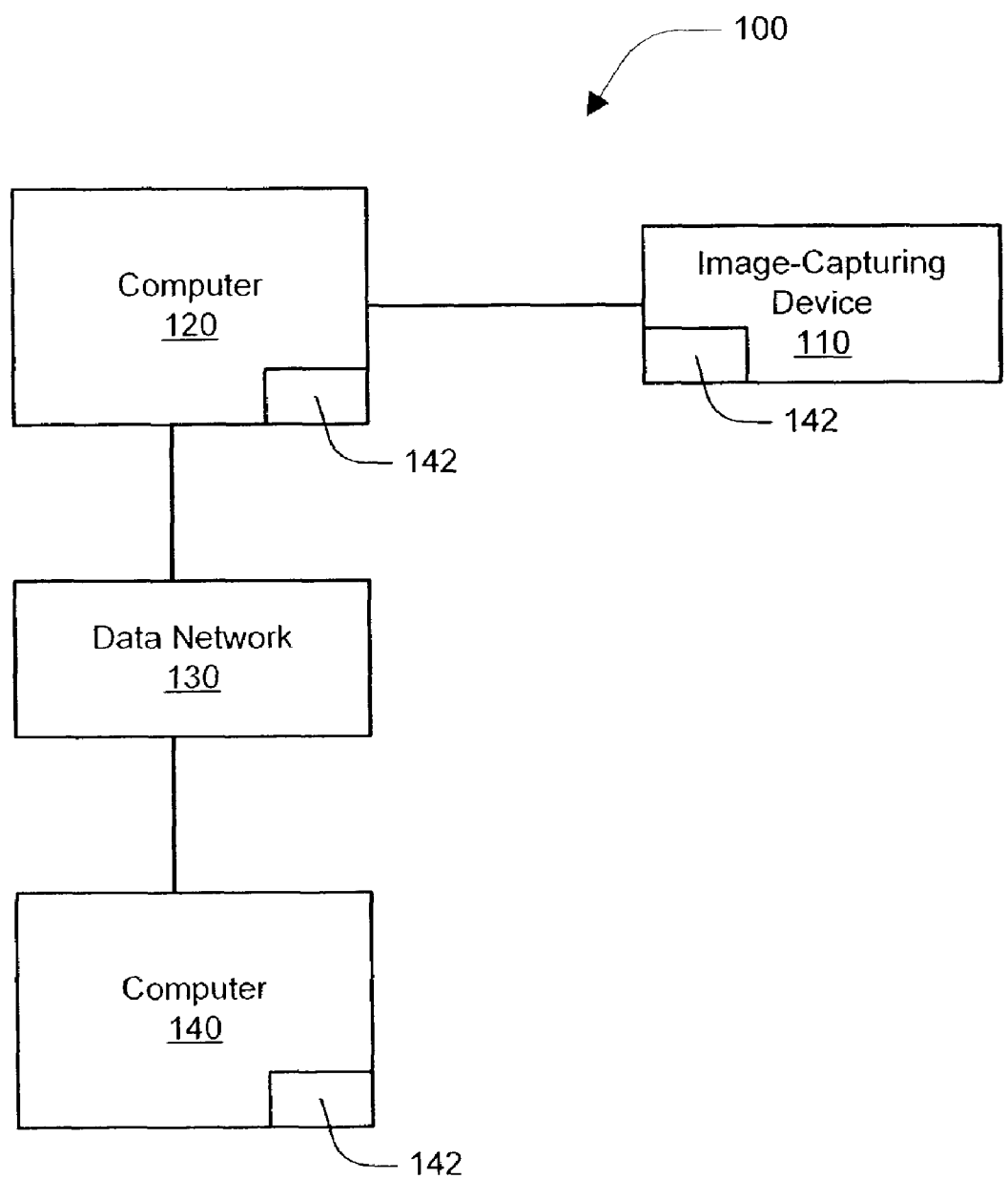
FIG. 1 is a block diagram of a setup for configuring a menu of an image-capturing device from a remote computer according to an embodiment of the present invention.

FIG. 1 is a block diagram illustrating a setup 100 for configuring a menu of an image-capturing device 110, such as a digital camera, from a remote computer 140, according to an embodiment of the present invention. In setup 100, image-capturing device 110 is communicatively coupled to a computer 120. In one embodiment, computer 120 is communicatively coupled to a data network 130, such as the Internet, a local area network, or the like. In other embodiments, one or more computers 140 are also communicatively coupled to data network 130 and are located remotely of computer 120 and image-capturing device 110. For some embodiments, computer 120 is an integral processor and memory of image-capturing device 110. For another embodiment, computer 140 is wirelessly coupled to data network 130, and data network 130 is wirelessly coupled to computer 120. In other embodiments, computer 120 is wirelessly coupled directly to computer 140. Wireless communications between computer 140, data network 130, and computer 120 or directly between computers 120 and 140 can include radio frequency (RF) communications, infrared (IR) communications, microwave communications, and other techniques for communicating between devices without the need for a physical connection.

Figure 2:
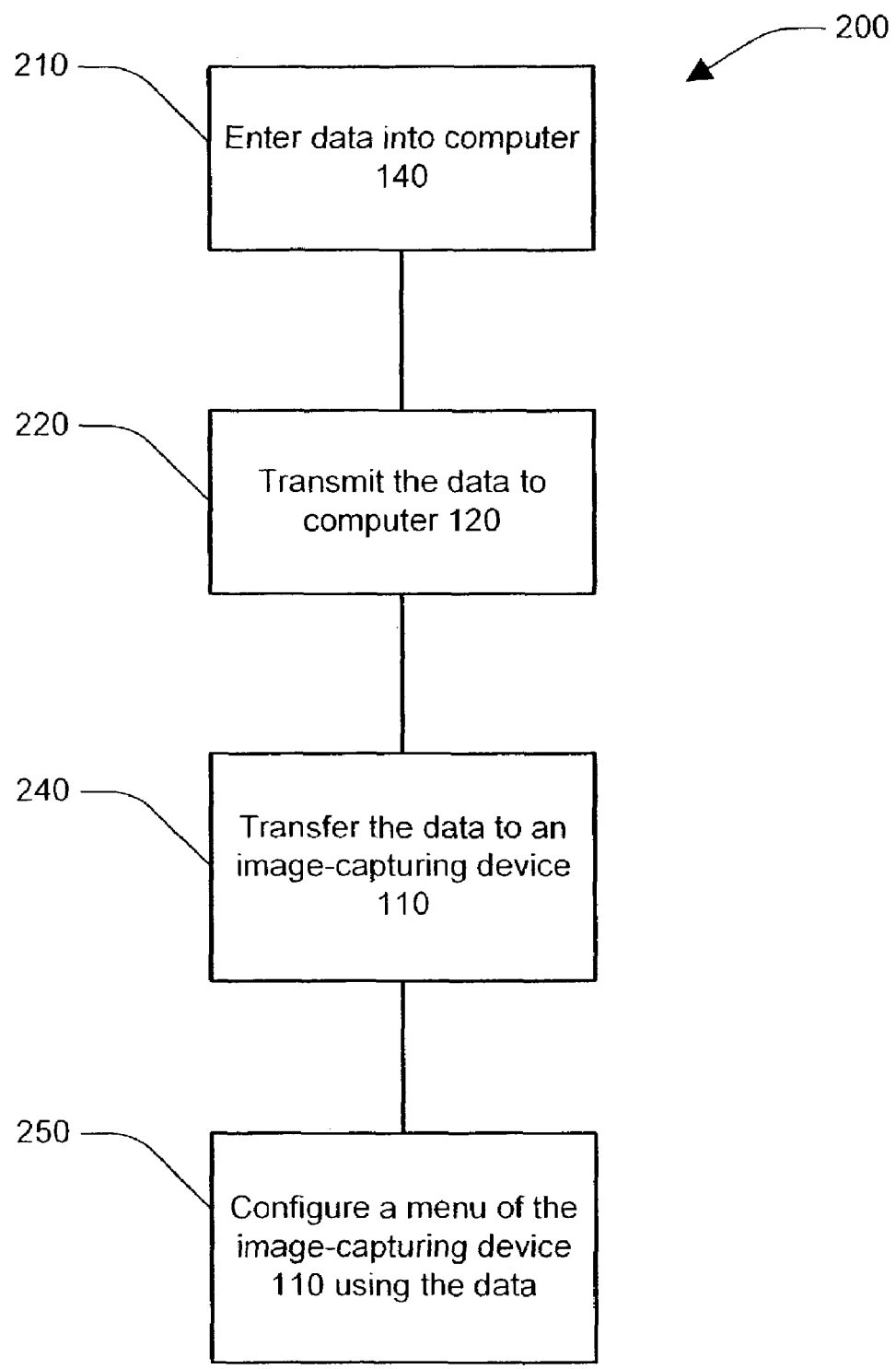
FIG. 2 is a flowchart of a method for configuring a menu of an image-capturing device according to another embodiment of the present invention.

FIG. 2 is a flowchart of a method 200 for configuring the menu of image-capturing device 110. At block 210, data are entered into computer 140. In one embodiment, this includes creating a data file. In another embodiment, the data include an initial menu configuration for image-capturing device 110. For other embodiments, the data include items to be added to or changed within an existing menu of image-capturing device 110, such as email addresses, website locations, or the like. For some embodiments, items are added to or changed within the existing menu by replacing the existing menu with a new menu. For another embodiment, the data are stored in a removable storage media 142 removably connected to computer 140. Examples of storage media 142 include flash memory cards (e.g., CompactFlash available from SanDisk Corporation, Sunnyvale, Calif., USA, and Memory Stick available from Sony Corporation, Japan), floppy disks, compact discs, Universal Serial Bus (USB) drives, etc.

The data are transmitted to computer 120 at block 220. For one embodiment, the file is an email attachment and is emailed from computer 140 to computer 120 via data network 130. In another embodiment, the data are transmitted from computer 140 to a website or server on data network 130 and are stored there. Subsequently, the data are transmitted from the website or server to computer 120. For one embodiment, the data are wirelessly transmitted directly from computer 140 to computer 120. For some embodiments, the data are transferred from computer 140 to computer 120 by removing storage media 142 from computer 140, transporting storage media 142 to computer 120 (e.g., mailing, hand carrying, or the like), and connecting storage media 142 to computer 120.

At block 240, the data are transferred to image-capturing device 110 from computer 120 and are used to configure the menu of image-capturing device 110 at block 250. For one embodiment, the data are transferred directly from computer 140 to image-capturing device 110 by removing storage media 142 from computer 140, transporting storage media 142 to image-capturing device 110 (e.g., mailing, hand carrying, or the like), and connecting storage media 142 to image-capturing device 110.

In another embodiment, the data are manually transferred to image-capturing device 110 from computer 120. For one embodiment, this is in response to prompting a user of computer 120 to send the data to image-capturing device 110. This can include the user of computer 120 opening an email attachment containing the data and sending the data to Image-capturing device 110, sending the email attachment directly to image-capturing device 110 without opening the attachment, retrieving the data from the website or server and sending the data to the image-capturing device 110, launching a program for image-capturing device 10 and selecting an option for configuring the menu, opening a file contained on storage media 142, etc. For one embodiment, opening the email attachment or the file contained on storage media 142 launches a program for image-capturing device 110 that displays the attachment as a menu for image-capturing device 110.

Figure 3:
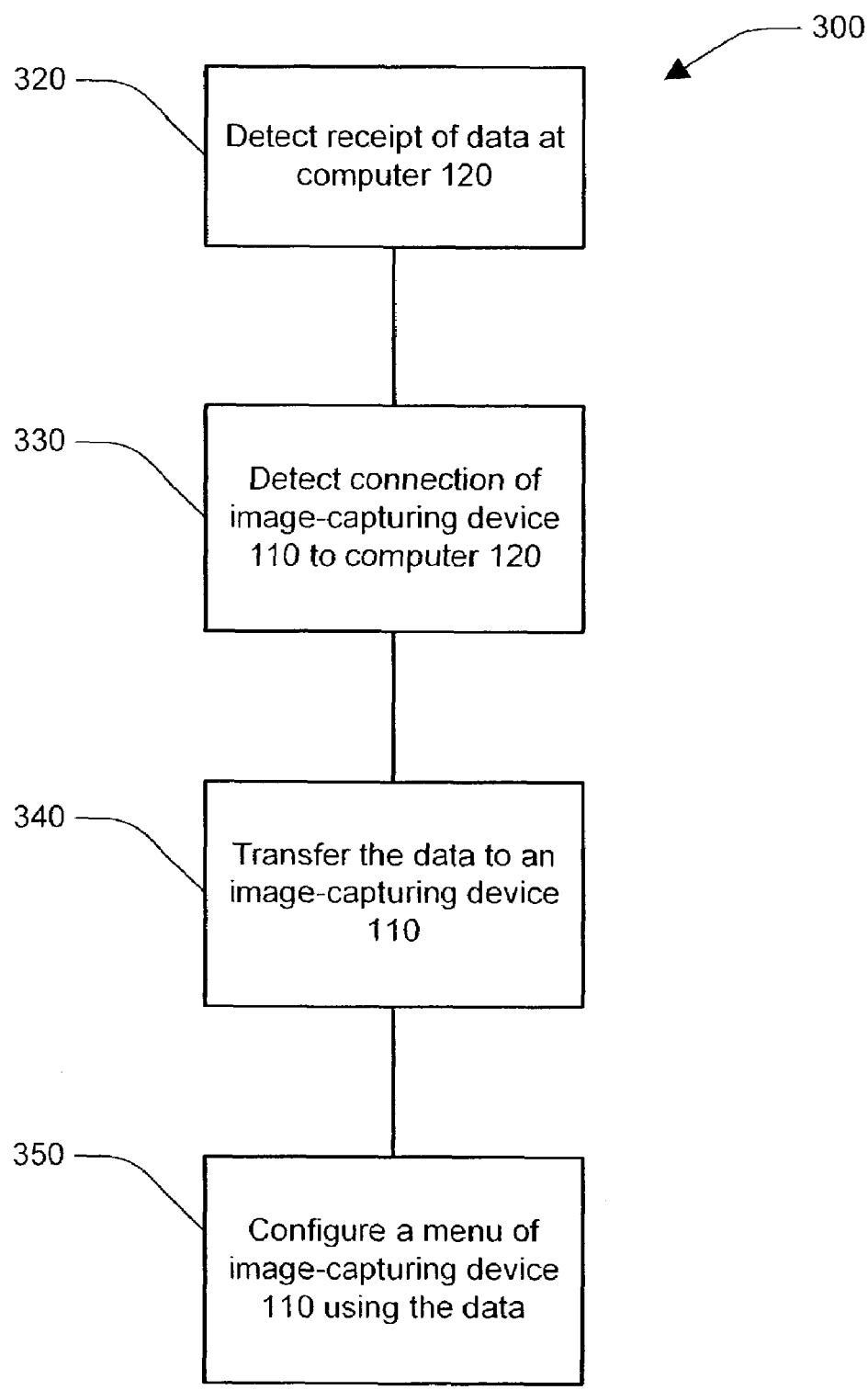
FIG. 3 is a flowchart of a method for configuring a menu of an image-capturing device according to yet another embodiment of the present invention.

FIG. 3 is a flowchart of a method 300 for configuring the menu on image-capturing device 110 according to another embodiment of the present invention. Method 300 is performed in response to computer-readable instructions that are supplied to a user on a removable computer-usable medium, such as a compact disc read-only memory (CD-ROM) and are, for example, stored on a hard drive of computer 120. Note that for some embodiments, computer 120 is an integral processor of image-capturing device 110 and methods performed by computer 120 are being performed by image-capturing device 110. At block 320 of method 300, computer 120 detects that data for configuring the menu are received at computer 120. For some embodiments, detecting the data includes monitoring an email inbox on computer 120. In particular, for one embodiment, computer 120 looks for an indicator indicative that the data are for configuring the menu of image-capturing device 110. Examples of indicators include a file name or file-name extension for a file containing the data, a name of an email to which the data are attached, or the like. For another embodiment, computer 120 reads the indicator and compares the indicator to a predetermined indicator, and, for example, when the indicator and the predetermined indicator match, the data for configuring the menu are detected. For one embodiment, detecting that data for configuring the menu are received at computer 120 includes detecting that storage media 142 is connected to (or received by) computer 120 and detecting a file name or file-name extension for a file contained in storage media 142 containing the data.

In one embodiment, computer 120 displays a message indicating that data for configuring the menu of image-capturing device 110 have been received upon detecting the data, such as when the user launches software for image-capturing device 110. In another embodiment, computer 120 prompts the user to connect image-capturing device 110 to computer 120 after detecting the data, when image-capturing device 110 is not connected to computer 120.

At block 330, computer 120 detects that image-capturing device 110 is communicatively coupled to computer 120. For one embodiment, this includes computer 120 detecting completion of an electrical circuit, e.g., by sensing a current flow, and interrogating image-capturing device 110 to ascertain that an image-capturing device is coupled to computer 120. Then, at block 340, the data are transferred to image-capturing device 110 and are used to configure image-capturing device 110 at block 350. In one embodiment, detecting receipt of the data and the coupling image-capturing device 110 triggers the data to be transferred to the menu of image-capturing device 110.

For some embodiments, computer 120 prompts the user to select a preference for transferring the data to image-capturing device 110 from two or more preferences. For example, for one embodiment, a first preference allows the data to be transferred to image-capturing device 110 upon detecting receipt of the data and the coupling image-capturing device 110 without user input. A second preference, on the other hand, requires user input before the data can be transferred to image-capturing device 110. That is, the user has to elect whether to transfer the data to image-capturing device 110. The second preference also provides the user with an option for reviewing and/or modifying the data before electing to transfer the data to image-capturing device 110.

In another embodiment, computer 120 compares an identifier of an item of the data to identifiers of items of a menu that already exists on image-capturing device 110. In some embodiments, a data item having an identifier that is not present in the existing menu is added to the existing menu. In other embodiments, a data item replaces an item of the existing menu having the same identifier. For one embodiment, this includes deleting the item of the existing menu when the identifier of the data item includes an instruction to delete the item of the existing menu. For some embodiments, instead of modifying an existing menu by replacing, deleting and/or adding menu items, the existing menu is overwritten by the data, i.e., the existing menu is deleted and is replaced with data corresponding to a new menu having the desired replacements, deletions, and/or additions. For one embodiment, this is a default and occurs in response to transmitting the data to image-capturing device 110. For another embodiment, the above-described indicator of the data includes, for example, an additional character, that when matched with a predetermined character, causes computer 120 to overwrite the existing menu with the data.

Figure 4:
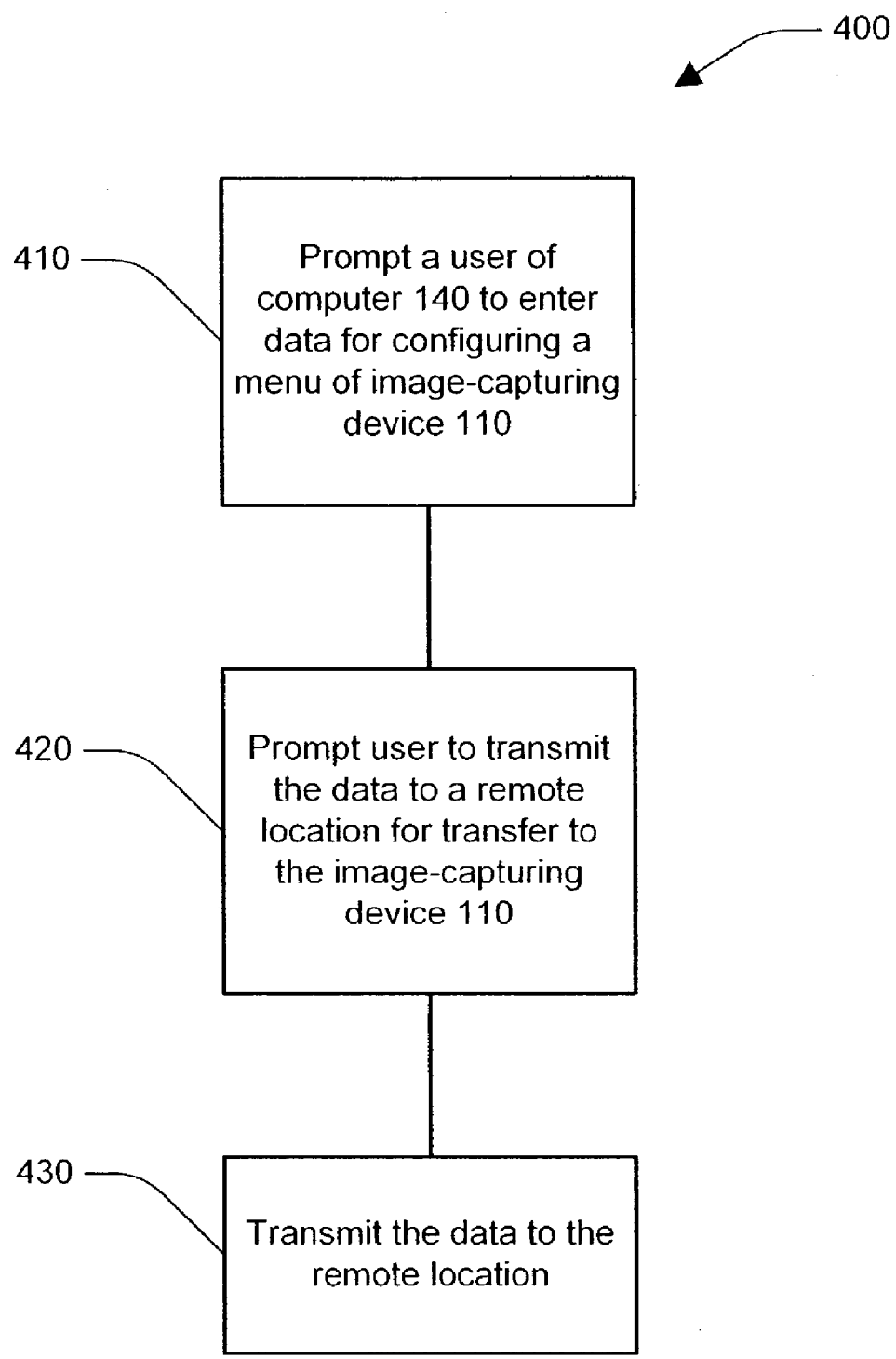
FIG. 4 is a flowchart of a method for configuring a menu of an image-capturing device according to still another embodiment of the present invention.

Computer-readable instructions that are supplied to a user of computer 140 on a removable computer-usable medium, such as a compact disc read-only memory (CD-ROM) are, for example, stored on a hard drive of computer 140. For one embodiment, the computer-readable instructions are adapted to cause computer 140 to perform a method 400 for causing computer 140 to configure the menu of image-capturing device 110 according to another embodiment of the present invention, as illustrated by the flowchart of FIG. 4. For one embodiment, method 400 is initiated when a user selects an option, e.g., a "wizard," provided by the computer-readable instructions.

At block 410, a user of computer 140 is prompted to enter data for configuring the menu of image-capturing device 110. For one embodiment, this includes prompting the user to indicate if the data include a new menu, modify an existing menu of image-capturing device 110, or the like. In another embodiment, for a new menu, the user is prompted to input a label for identifying the new menu. In another embodiment, a copy of the new menu is stored under the label within computer 140, e.g., for retrieval and modification. For another embodiment, when the data modify an existing menu, the user is prompted to input a label that identifies a modified version of that menu. In this embodiment, the user enters data to modify the existing menu and stores the modified version under the label that previously identified the existing menu or under a label created specifically for the modified version. For some embodiments, the above-described identifier used by computer 120 for detecting receipt of the data is attached to the label.

In some embodiments, computer 140 attaches an identifier to an item of the data. As described above, computer 120, for another embodiment, compares the identifier to identifiers of items of a menu that already exists on image-capturing device 110.

For embodiments that include entering data on storage media 142, computer 140 prompts the user to connect storage media 142 to computer 140 before prompting the user to enter the data. For one embodiment, computer 140 prompts the user to enter the data in response to computer 140 detecting that storage media 142 is connected to (or received by) computer 140.

At block 420, the user is prompted to transmit the data to a remote location for transfer to image-capturing device 110. For one embodiment, this includes prompting the user to input the remote location, such as the email address for computer 120, a website or server of data network 130, etc. In another embodiment, inputting the remote location stores the remote location under the label that identifies the new menu or modified menu. In some embodiments, inputting the remote location, includes selecting the label that identifies the copy of the menu stored at computer 140. At block 430, the data are transmitted to the remote location, e.g., computer 120, the website or server of data network 130, etc. In one embodiment, this includes packaging the data as an email attachment, attaching the attachment to an email, placing the email in an email outbox of computer 140, and emailing the data to an email address of the user of computer 120. In another embodiment, the data are packaged to be transmitted from computer 140 to a website or server on data network 130 and are stored on the website or server for retrieval by computer 120.

CONCLUSION

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any adaptations or variations of the invention. It is manifestly intended that this invention be limited only by the following claims and equivalents thereof.

What is claimed is:

1. A method for configuring a menu of an image-capturing device, the method comprising:
   receiving data from a remote location at a computer, wherein the data is associated with the menu of the image-capturing device;
   detecting receipt of the data at the computer;
   prompting the user to connect the image-capturing device to the computer, when the image-capturing device is not connected to the computer, after detecting receipt of the data;
   detecting that the image-capturing device is communicatively coupled to the computer;
   transferring the data to the image-capturing device from the computer; and
   using the data to modify the menu without replacing the entire menu.

2. The method of claim 1, wherein receiving data from a remote location comprises receiving the data as an email attachment.

3. The method of claim 1, wherein receiving data from a remote location comprises receiving the data from a website.

4. The method of claim 1, wherein receiving data from a remote location comprises receiving the data from a removable storage medium removably connected to the computer.

5. The method of claim 1, wherein detecting receipt of the data at the computer comprises monitoring an email inbox of the computer.

6. The method of claim 1, wherein detecting receipt of the data at the computer comprises comparing a first indicator of the data to a predetermined second indicator.

7. The method of claim 6, wherein detecting receipt of the data at the computer comprises matching the first indicator to the second indicator.

8. The method of claim 1, wherein detecting receipt of the data at the computer comprises detecting connection of a removable storage media to the computer, wherein the removable storage media contains the data.

9. The method of claim 1, further comprising indicating that the data has been received at the computer.

10. The method of claim 1, further comprising prompting a user of the computer to transfer the data to the image-capturing device after detecting receipt of the data at the computer.

11. The method of claim 1, further comprising prompting a user of the computer to select a preference from at least first and second preferences for transferring the data to the image-capturing device.

12. The method of claim 11, wherein the first preference comprises allowing the data to be transferred to the image-capturing device without input from the user, and the second preference comprises requiring a user input before transferring the data to the image-capturing device.

13. The method of claim 12, wherein the second preference further comprises providing the user with an option for at least one of reviewing and modifying the data before transferring the data to the image-capturing device.

14. A computer-usable medium containing computer-readable instructions for causing a computer to perform a method, the method comprising:
   detecting receipt of data from a remote location at the computer, wherein the data are associated with a menu of an image-capturing device;
   prompting the user to connect the image-capturing device to the computer, when the image-capturing device is not connected to the computer, after detecting receipt of the data;
   transferring the data from the computer to the image-capturing device; and
   using the data transferred to the image-capturing device to modify the menu without replacing the entire menu.

15. The computer-usable medium of claim 14, wherein the method further comprises indicating that the data has been received at the computer.

16. The computer-usable medium of claim 14, wherein the method further comprises prompting a user of the computer to transfer the data to the image-capturing device after detecting receipt of the data at the computer.

17. The computer usable medium of claim 14, wherein detecting receipt of the data comprises monitoring an email inbox of the computer.

18. The computer-usable medium of claim 14, wherein detecting receipt of the data at the computer comprises comparing a first indicator of the data to a predetermined second indicator.

19. The computer-usable medium of claim 18, wherein detecting receipt of the data at the computer further comprises matching the first indicator to the second indicator.

20. The computer-usable medium of claim 14, wherein detecting receipt of the data at the computer comprises detecting connection of a removable storage media to the computer, wherein the removable storage media contains the data.

21. The computer-usable medium of claim 14, wherein the method further comprises detecting that the image-capturing device is communicatively coupled to the computer.

22. The computer-usable medium of claim 14, wherein the method further comprises comparing an identifier of an item of the data to identifiers of items that already exist on the image-capturing device.

23. The computer-usable medium of claim 14, wherein the method further comprises prompting a user of the computer to select a preference from at least first and second preferences for transferring the data to the image-capturing device.

24. The computer-usable medium of claim 23, wherein the first preference comprises allowing the data to be transferred to the image-capturing device without input from the user, and the second preference comprises requiring a user input before transferring the data to the image-capturing device.

25. The computer-usable medium of claim 24, wherein the second preference further comprises providing the user with an option for at least one of reviewing and modifying the data before transferring the data to the image-capturing device.

26. A computer-usable medium containing computer-readable instructions for causing a first computer to perform a method, the method comprising;
   prompting a user of the first computer to enter data for modifying a menu of an image-capturing device without replacing the entire menu;
   prompting the user of the first computer to input a label for identifying the data;
   prompting the user of the first computer to transmit the data to a remote location for transfer to the menu; and
   transmitting the data to the remote location.

27. The computer-usable medium of claim 26, wherein transmitting the data to the remote location comprises emailing the data from the first computer to a second computer that is connectable to the image-capturing device.

28. The computer-usable medium of claim 27, wherein emailing the data from the first computer to a second computer, comprises:
   packaging the data as an email attachment;
   attaching the attachment to an email; and
   placing the email in an email outbox of the first computer.

29. The computer-usable medium of claim 26, wherein transmitting the data to the remote location comprises transmitting the data to a data network.

30. The computer-usable medium of claim 26, wherein prompting the user of the first computer to transmit the data comprises prompting the user to input the remote location.

31. The computer-usable medium of claim 26, wherein the method further comprises attaching an indicator to the label for detection at a second computer.

32. The computer-usable medium of claim 26, wherein the method further comprises attaching an identifier to an item of the data.

33. The computer-usable medium of claim 26, wherein transmitting the data to the remote location comprises wirelessly transmitting the data to a second computer.

34. The computer-usable medium of claim 26, wherein the method further comprises prompting the user to connect a removable storage media for storing the data to the first computer before prompting the user of the first computer to enter data for configuring the menu of the image-capturing device to enter the data.

35. The computer-usable medium of claim 26, wherein the method finther comprises storing the data on a storage media removably connected to the first computer before transmitting the data to the remote location.

36. A computer-usable medium containing computer-readable instructions for causing a first computer to perform a method, the method comprising:
   prompting a user of the first computer to enter data for modifying a menu of an image-capturing device without replacing the entire menu;
   prompting the user of the first computer to transmit the data to a remote location for transfer to the menu; and
   transmitting the data to the remote location;
   wherein prompting the user of the first computer to enter data for modifying the menu of the image-capturing device is in response to detecting that a removable storage media is connected to the first computer.

* * * * *

UNITED STATES PATENT AND TRADEMARK OFFICE
CERTIFICATE OF CORRECTION

PATENT NO.       : 7,304,666 B2  
APPLICATION NO.  : 10/385775  
DATED            : December 4, 2007  
INVENTOR(S)      : Robert Paul Cazier It is certified that error appears in the above-identified patent and that said Letters Patent is hereby corrected as shown below:

In column 3, line 14, after "device" delete "10" and insert -- 110 --, therefor.

In column 8, line 29, in Claim 35, delete "finther" and insert -- further --, therefor.

Signed and Sealed this

Seventeenth Day of June, 2008

JON W. DUDAS  
*Director of the United States Patent and Trademark Office*